Figure 1:
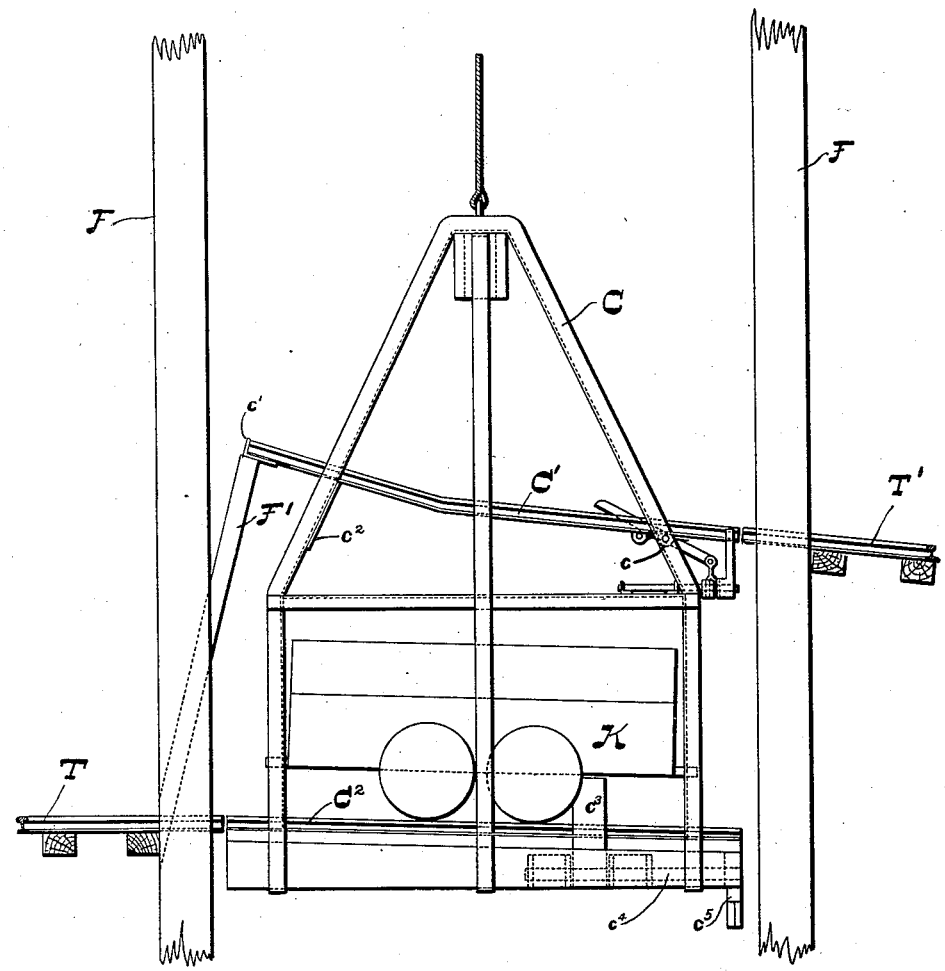

F. C. GREENE & C. G. PALMER.
MECHANISM FOR HANDLING CARS.
APPLICATION FILED DEC. 4, 1905.

1,017,868.

Patented Feb. 20, 1912.

8 SHEETS—SHEET 1.

WITNESSES:

INVENTORS
Frank C. Greene & Charles G. Palmer
BY THEIR
ATTORNEY

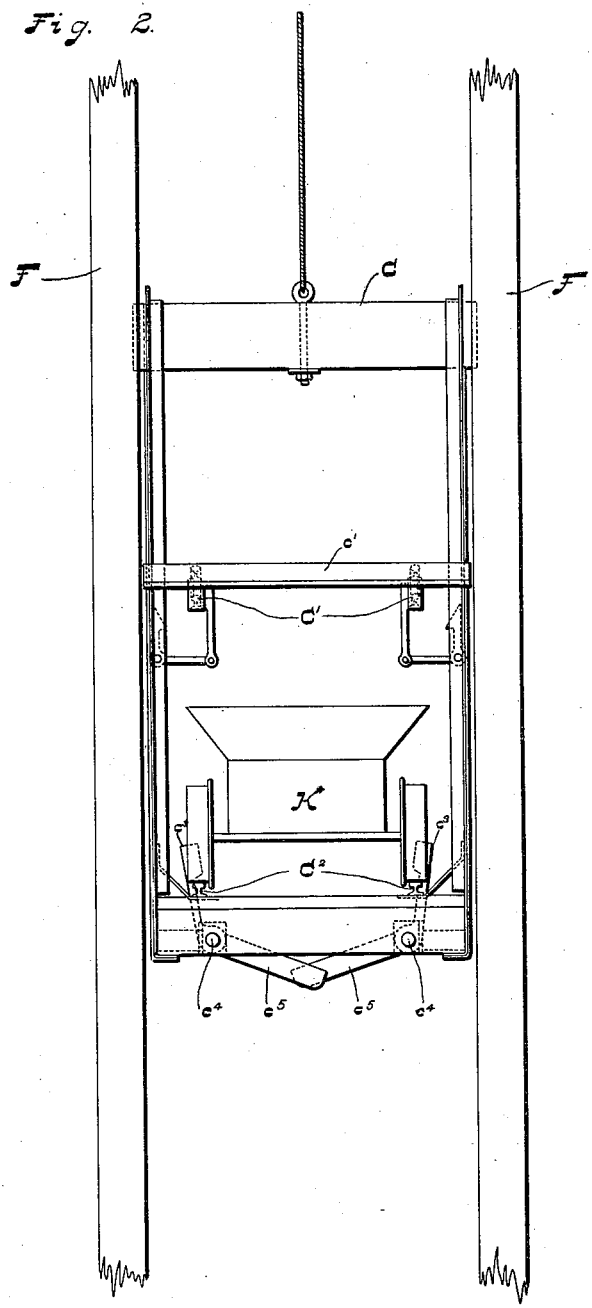

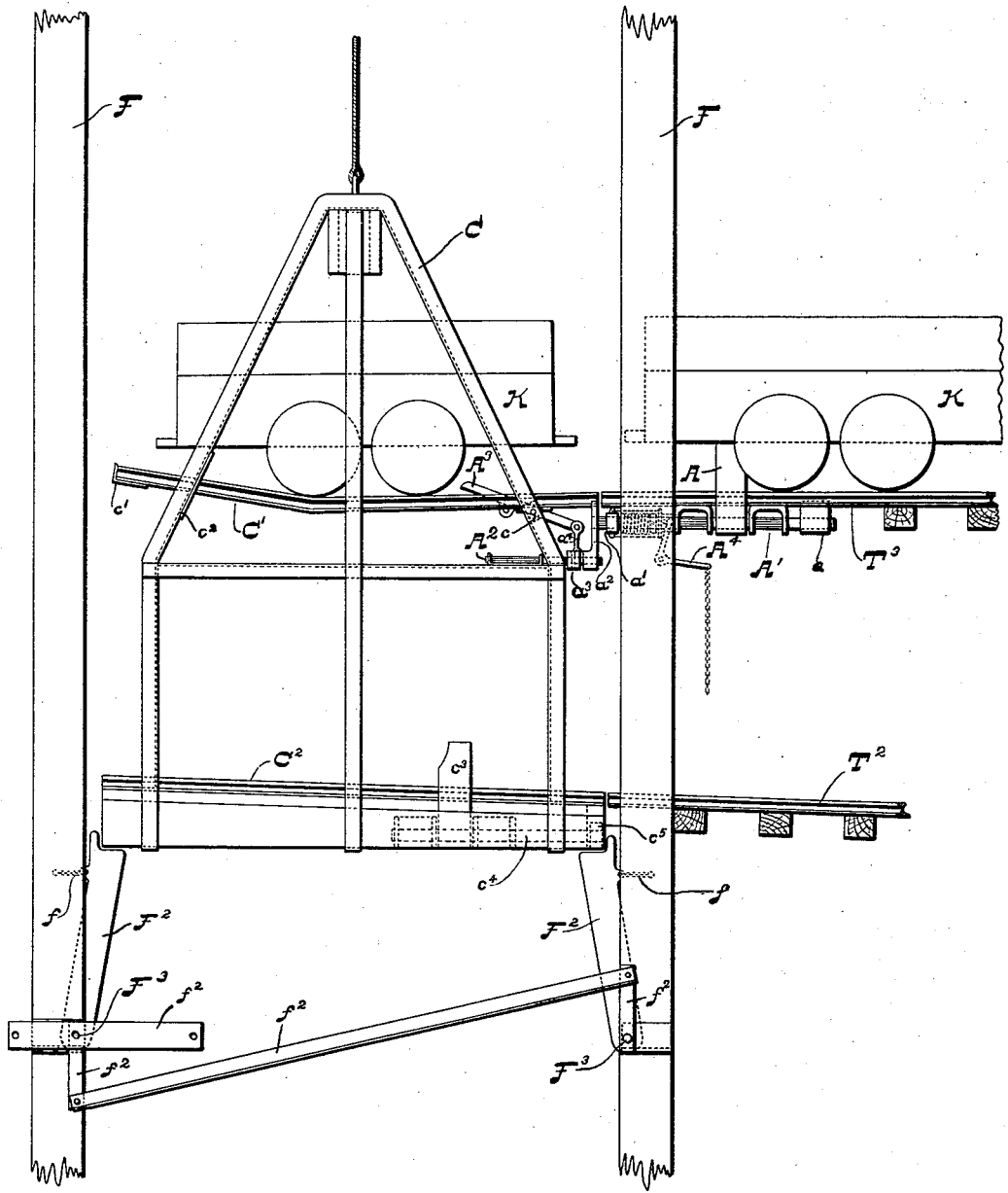

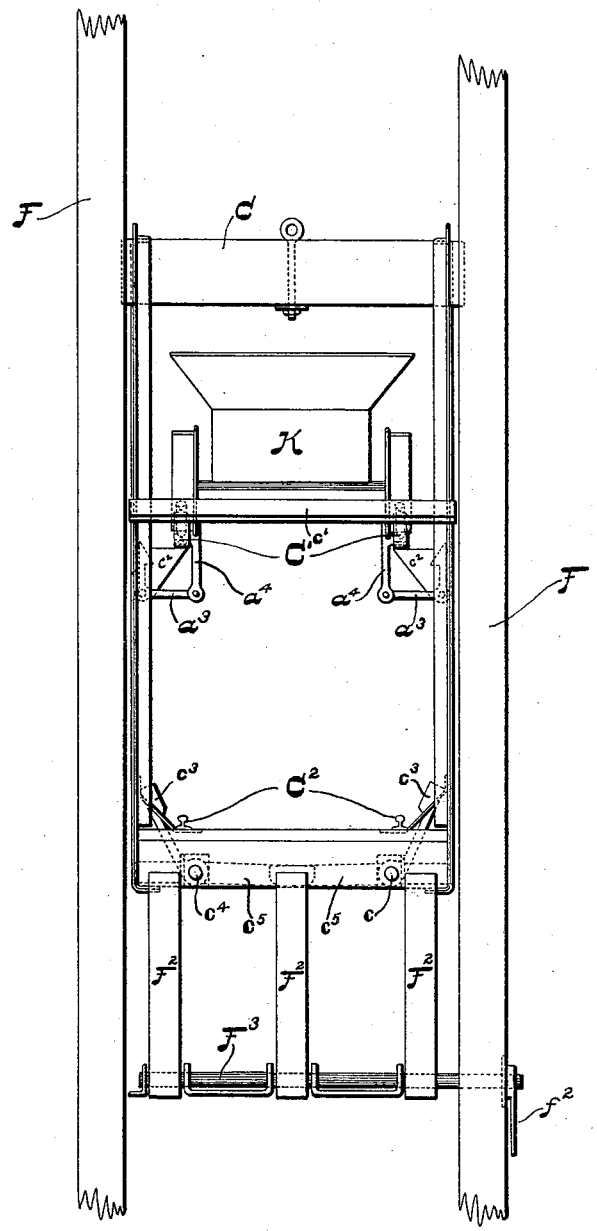

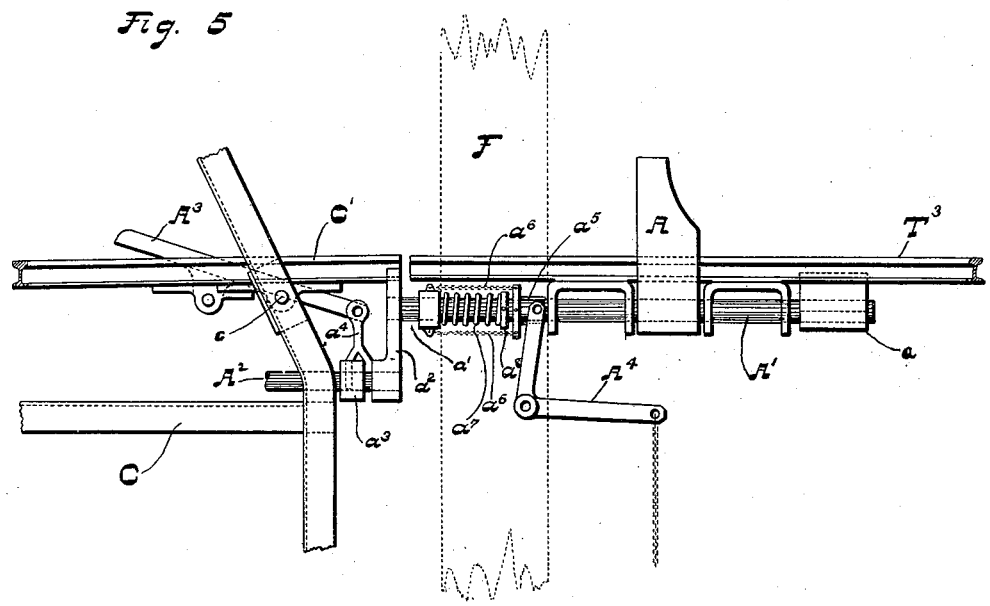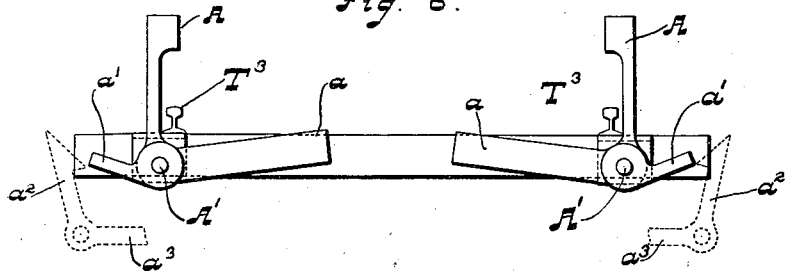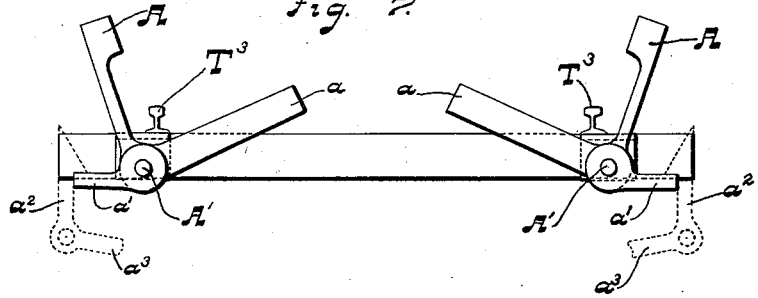

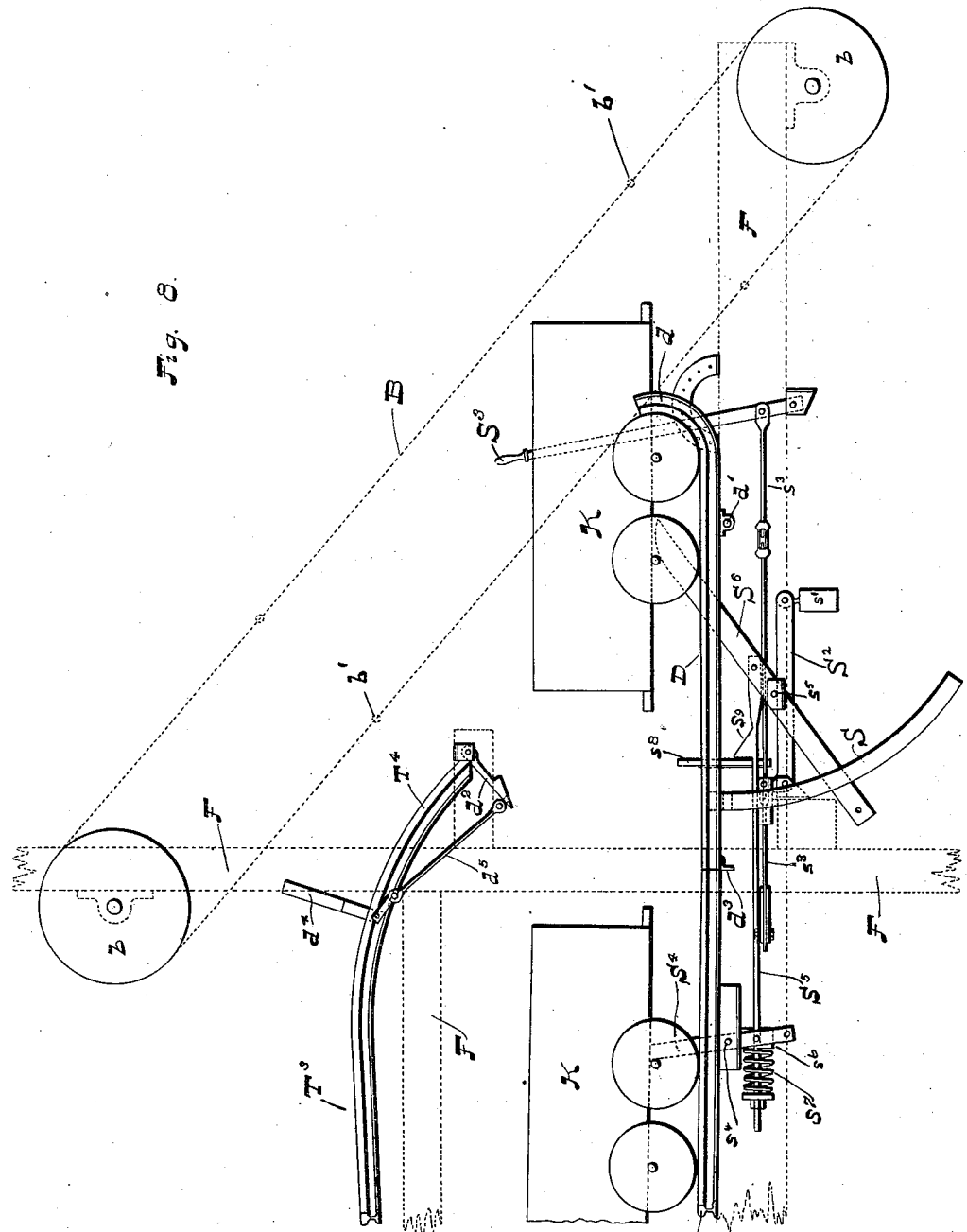

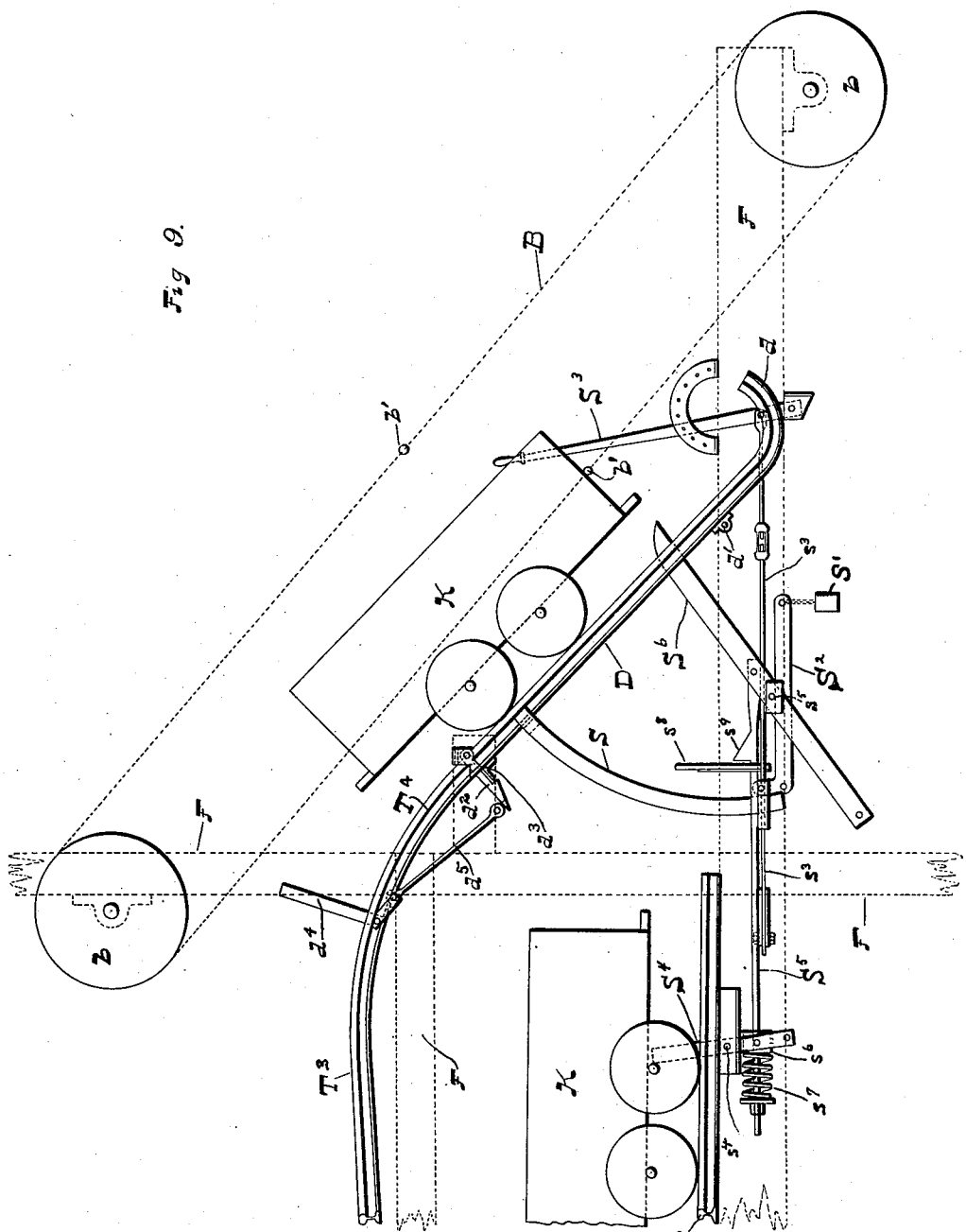

F. C. GREENE & C. G. PALMER.
MECHANISM FOR HANDLING CARS.
APPLICATION FILED DEC. 4, 1905.
1,017,868.
Patented Feb. 20, 1912.
8 SHEETS—SHEET 8.
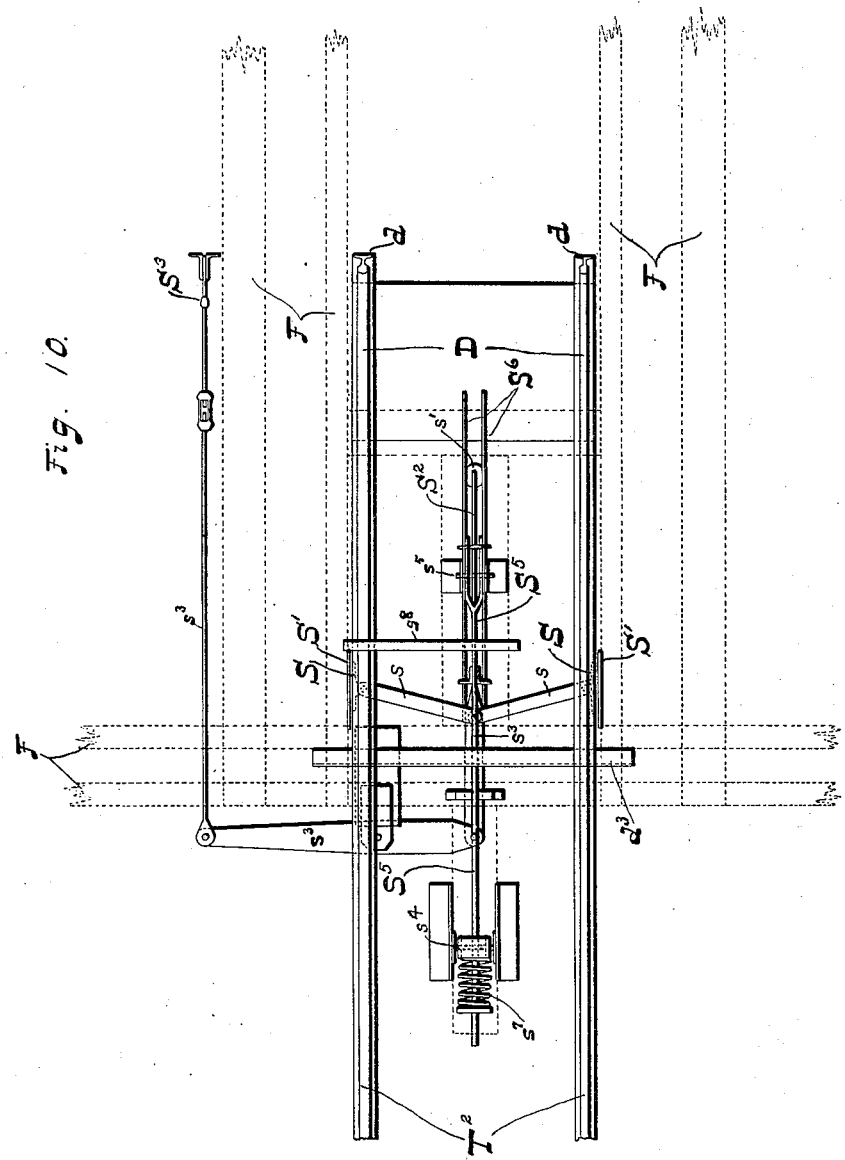
WITNESSES:
Rob't P. Millard
Jno. F. Oberlin
INVENTORS
Frank C. Greene & Charles G. Palmer
BY THEIR
J. De Fay
ATTORNEY

UNITED STATES PATENT OFFICE.

FRANK C. GREENE, OF CLEVELAND, AND CHARLES G. PALMER, OF EAST CLEVELAND, OHIO; SAID PALMER ASSIGNOR TO SAID GREENE.

MECHANISM FOR HANDLING CARS.

1,017,868.  Specification of Letters Patent.  Patented Feb. 20, 1912.

Application filed December 4, 1905. Serial No. 290,101.

*To all whom it may concern:*

Be it known that we, FRANK C. GREENE and CHARLES G. PALMER, both citizens of the United States, residents of Cleveland and East Cleveland, respectively, county of Cuyahoga, and State of Ohio, have invented new and useful Improvements in Mechanism for Handling Cars, of which the following is a specification, the principle of the invention being herein explained and the best mode in which we have contemplated applying that principle, so as to distinguish it from other inventions.

Our invention relates to mechanism for handling cars and particularly to mechanism for handling cars in coal mines and like situations.

Our invention embraces, in conjunction with the usual shaft and tipple structure, novel means for receiving and raising the loaded cars to the surface, there unloading them, thereupon returning them to the shaft, and then lowering them again to the bottom.

The object is to make these operations practically continuous and, so far as it is possible, automatic, thus securing not only an increased efficiency, but a reduction in expense in the running of the plant.

To the accomplishment of this end our invention consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings:—Figure 1 represents in side elevation an improved type of cage which forms one of the features of our car handling mechanism, the cage being represented as at rest at the bottom of the shaft. Fig. 2 represents an end elevation of such cage as it would appear in ascending the shaft, the view being from the left as the cage is shown in Fig. 1. Fig. 3 shows a side elevation of such cage in its position of rest at the top of the shaft. Fig. 4 is an end view of the same, taken from the left in Fig. 3. Figs. 5, 6 and 7 each represent an enlarged view of certain of the details appearing in Figs. 3 and 4. Fig. 8 represents the dumping mechanism in position to receive a car preparatory to unloading the same. Fig. 9 shows the same in position to discharge a car. Fig. 10 is a plan view of such dumping mechanism.

The principle of operation which our car-handling mechanism embodies is that of the direct application of power at the fewest possible points in the system, sufficient potential energy being imparted at these points to actuate the mechanism throughout the remainder of the system, which is designed to utilize this energy for the most part automatically. Thus the track T, Fig. 1, in the mine, on which the loaded cars are brought to the shaft opening, is for the latter portion of its length downwardly inclined so as to cause such cars to approach the shaft under the impulse of gravity. The track T', which is designed to receive the empty cars as they are returned to the bottom of the shaft, is similarly inclined but extends in the opposite direction, there being enough difference between the levels of the two tracks where they abut on the shaft to permit a car on the lower track to pass freely beneath the upper track. Suitable switches are of course provided for accommodating the cars on track T' and for transferring them therefrom to the main entry track when it is desired to return them to the rooms of the mine. At the mouth of the shaft a similar arrangement prevails. Track $T^2$, Fig. 3, is designed to receive the loaded cars when they are raised to the top of the shaft, or to the desired height in the tipple structure, and is inclined downwardly from such point to the dump, the direction of inclination being the same as that of track T. The tipple structure, as also the timbering in the shaft, is designated throughout by the reference letter F. The cars are similarly designated by K. After being dumped the empty car is raised, by means hereinafter fully described, to another track $T^3$, which is inclined in the opposite direction and abuts on the shaft opening at a distance above that of track $T^2$ approximately equal to the distance between tracks T and T', at the bottom of the shaft. Aside, then, from the movement of the cars within the mine proper, which does not enter into our system, it is seen that power need be directly applied only in raising the cars from the bottom to the top of the shaft and from track T² to track T³ at the dump.

To raise and lower the cars in the shaft we utilize a cage C, Figs. 2 and 3. This cage has a double deck; the lower deck bears a fixed track C² that is inclined in the same direction as tracks T and T²; while the upper deck bears a track C' that is pivoted near one end at $c$ and bent at a point about one-third of its length from the opposite end in the manner shown in aforesaid Fig. 2. The effect of such upturned end is that of a stop or bumper with the desirable feature that the car is received without shock or jar. The rails are joined at this end by an angle bar $c'$, and normally rest on brackets $c^2$ projecting inwardly from the side members of the cage. When resting on these brackets the main portion of the track is inclined in a direction opposite to that of track C², see Fig. 3. At the bottom of the shaft, however, a projecting frame member F' is provided, Fig. 1, that is adapted, as the cage descends and comes to rest, to engage the bar $c'$ and raise the free end of track C' as indicated in the figure referred to, and so incline such track in a direction opposite to that normally occupied and similar to that of track C².

Track C² is provided near its lower end with stops, one on each side, whereby a car resting on such track is prevented from running off; each of these stops comprises a member $c^3$ keyed on a rock-shaft $c^4$ which is disposed parallel with the track. At one end this shaft is provided with an inwardly extending weighted arm $c^5$, the effect of which is to normally hold member $c^3$ in position above its appropriate rail so as to intercept a car-wheel moving thereon, Fig. 1. The upturned end of track C' serves a similar purpose in connection with such track.

The disposition of mine-tracks T, T', and of cage-tracks C', C², is such that when the cage is at the bottom of the shaft, Fig. 1, and the free end of track C' upraised in the manner just set forth, the other end of such track will register with track T' while the upper end of track C² will register with track T. In this situation it will be seen that a car upon cage-track C' will be discharged upon track T' with an initial speed depending upon the angle of inclination of such track C', which depends in turn upon the height of member F'. At the same time a loaded car left free upon track T will move off from such track onto the lower deck of the cage, being retained there by stop-members $c^3$. In like fashion at the top of the shaft, Fig. 3, tipple-tracks T², T³, are so arranged that the end of cage-track C', which here occupies its normal position, will register with track T³ at the same time that the lower end of cage-track C² registers with track T². It is hence evident that in this position a car resting upon the lower deck of the cage will, upon the removal of stop-members $c^3$, of its own accord move off onto track T² and there proceed until an obstacle is encountered. In like manner a car freely resting upon track T³ will descend and pass onto the upper deck of the cage, being retained there by the upturned ends of the rails as has already been set forth. To hold the cage in position for such tracks to register as has just been described, pivoted keeps F² are provided as shown in Figs. 3 and 4. The lower ends of these keeps, at which they are mounted upon rock-shafts F³, lie without the path of travel of the cage; their upper ends, however, project inwardly so as to be engaged by the sides of the cage as it ascends and be tilted outwardly thereby. Immediately the cage is by, they fall again into their forward position, being restrained from falling too far by chains $f$, and as the cage is allowed to settle down it rests upon their upper ends. As the cage thus settles down the central one of these keeps F², Fig. 4, raises the weighted arms $c^5$ by which stop-members $c^3$ on the lower deck of the cage are operated and thus automatically clears the way for the loaded car to pass onto tipple track T². When it is desired to lower the cage, it is first raised slightly and then such keeps F² are tilted back out of its path, a suitable system of levers $f^2$, connected with shafts F³, being designed to permit such actuation from any desired station.

To control the movement of empty cars from track T³ onto the upper deck of the cage we provide an automatically operated stop mechanism, Figs. 3, 5, 6 and 7, that, after one car has passed upon track C', prevents another from following. This mechanism comprises a pair of stop-members A each keyed on a rock-shaft A' disposed parallel with the track T³, and normally held in a position to engage a car descending such track, by means of an inwardly extending weighted arm $a$. This position is indicated in Fig. 6. One end of each rock-shaft A' projects a short distance within the mine shaft and has keyed thereon a short horizontally projecting arm or catch $a'$. Mounted along each side of the cage and just below its upper deck are rock-shafts A² each bearing a latch $a^2$ adapted to engage the corresponding catch $a'$. To normally retain such latches $a^2$ in position to engage catches $a'$, as also to free them from such engagement, an inwardly extending arm $a^3$ is mounted on each shaft A², and is connected, by means of a rod $a^4$ with the lower end of a lever A³, the upper end of which projects above the track C' so as to engage the tread of the wheel of a car passing onto the track. The weight of the lever $A^3$ is so disposed that, augmented by the weight of rod $a^3$ and arm $a^2$, it normally suffices to hold the latch $a^2$ in position to engage the catch. Accordingly as the cage is raised, as has been described in another connection, and is then allowed to descend until it rests upon keeps $F^2$, the latch $a^2$ engages catch $a'$ and so rocks shaft $A'$ thereby tilting stop-members A outwardly and permitting the car detained by such stop-members to enter the upper deck of the cage. As the wheels of such car, however, strike the upper ends of levers $A^3$, it is evident that latches $a^2$ will be tilted out of engagement with catches $a'$, which, thus freed, allow weighted arms $a$ to raise stop-members A in time to intercept the next succeeding car on track $T^3$.

The catch $a'$, once it is released, is raised out of reach of the latch $a^2$ as the latter falls back into its operative position upon the passage of the first car beyond lever $A^3$. This lever, it should be remarked, does not serve as a stop for a car upon track $C'$ since, in its normal position here occupied, such track inclines in the other direction. When the direction of inclination is changed at the bottom of the shaft, Fig. 1, the car easily passes over the raised end of the lever.

In case there is no empty car on track $T^3$ to enter the cage, the latch $a^2$ will not be actuated to release catch $a'$. To provide against this contingency an independent releasing device is provided. This consists, Figs. 3 and 5, of a sleeve $a^5$ loosely mounted upon shaft $A'$ and connected with catch $a'$, which is keyed on such shaft, by some flexible means as chains $a^6$. Catch $a'$ is normally held in position to be engaged by latch $a^2$ by means of a helical spring $a^7$ interposed between it and a collar $a^8$. A bell-crank $A^4$ is connected with sleeve $a^5$, by means of which catch $a'$ may be drawn out of engagement with latch $a^2$ as will be readily understood. Bell-crank $A^4$ is preferably connected with the system of levers by which keeps $F^2$ are designed to be operated, so that both may be actuated simultaneously.

It has been shown above how a loaded car is automatically received upon cage C at the bottom of the shaft and is automatically discharged upon tipple-track $T^2$ when the cage is brought to rest at the top of the shaft; also how an empty car is received on the cage at the top of the shaft and discharged therefrom at the shaft's bottom. It yet remains to describe the mechanism whereby such loaded car is dumped and then raised to tipple-track $T^3$, to be returned to the shaft. Such dumping mechanism, Figs. 8, 9, and 10, comprises essentially a dumping frame D composed of a short section of track, one end of which is adapted to register with the end of tipple-track $T^2$ and the other end of which is upturned to form a stop $d$ for a car received thereon from such track $T^2$ which, it has been noted, is downwardly inclined from the shaft mouth. Such track section D is pivoted at $d'$, the line of this pivotal axis being chosen so as to cause the center of gravity of a car resting against stop $d$ to lie without it. The weight of such car, it is thus seen, will cause the rear end of the dumping frame to tilt upwardly. Above the free end of the frame and arranged to act as a stop for the same as it swings upwardly, is the end $T^4$ of upper tipple-track $T^3$. This end $T^4$ is preferably curved in the manner shown in Fig. 8, so as to be in line with the dumping frame when it is inclined at the proper angle to insure the ready discharge of the contents of the car resting thereon. To prevent the frame from dropping back prematurely a catch $d^2$ is provided which is adapted to engage a cross-bar $d^3$ joining the ends of the rails of frame D.

To raise the car, after being emptied, up the inclined frame and on to track $T^3$, we provide a pair of endless cables B running over pulleys or sheaves $b$ and joined at suitable intervals by cross rods $b'$. The disposition of these cables is such that the cross bars $b'$ are adapted to engage the lower end of a car when the frame D occupies its inclined position, Fig. 9, and move it to the desired position on track $T^3$. As the car thus passes off frame D and on to track $T^3$ it depresses a lever arm $d^4$ which, being connected with catch $d^3$ by means of a bar $d^5$, thereupon actuates such catch to release frame D. The center of gravity of such frame, when relieved of the car, being within pivotal axis $d$ it falls again to its normal horizontal position.

The oscillatory motion of frame D is controlled by suitable braking means preferably comprising curved swords S attached, one on each side, near the free end of the frame, and held against friction plates $S'$, Fig. 10, by means of toggle-arms $s$ actuated by a lever $S^2$ having a weight $s'$ attached to its outer end. To release the brake a hand-lever $S^3$ is connected with such toggle-arms $s$ by means of suitable rods and levers $s^3$ whereby the weighted arm $S^2$ may be raised as will be readily understood. The weighted arm $S^2$, it will thus appear, automatically secures the frame in whatever position it may chance to occupy, and the frame is free to move only when hand lever $S^3$ is actuated.

To prevent the cars on track $T^2$ from crowding upon the dumping frame, a stop-device is provided whereby only one car at a time is admitted upon such frame, the succeeding car being held until the frame returns to its normal position after the dumping operation. This stop-device comprises a stop-member $S^4$ pivoted upon a transverse axis $s^4$ near the end of track $T^2$. In its vertical position this member extends far enough above the track to intercept a passing car. A rod $S^5$ connects its lower end with the lower end of an inclined lever arm $S^6$ fulcrumed at $s^5$ in the tipple structure beneath the dumping frame D and normally projecting far enough above such frame to be engaged by a car resting thereon. Both stop-member $S^4$ and arm $S^6$ are preferably formed of two bars, the end of rod $S^5$ in each case lying between such two bars and being pivotally secured thereto. For reasons that will appear this connection should, at least at one end, be of a resilient character. This we secure by pivotally mounting a cross-head $s^6$ between the lower ends of the two bars forming member $S^4$, and then passing rod $S^5$ through an opening in such cross-head and joining it thereto by means of a helical spring $s^7$.

Lying beneath the free end of dumping frame D and transversely thereto is a pivoted latch $s^8$, adapted to engage a catch $s^9$ upon rod $S^5$. When thus engaged said rod is held so as to maintain stop-member $S^7$ vertical; in the normal position of frame D, however, such latch is held out of engagement with the rod by the pressure of such frame resting upon its outer end.

From the foregoing description of the mechanism of the dump the manner of its operation is readily perceived. Assuming the dump to be empty and in its normal position, a car proceeding down track $T^2$ will engage stop-member $S^4$, trip the same, and pass upon the dumping frame D until there stopped by upturned ends $d$ of the frame track. In so doing it will have depressed lever arm $S^6$, Fig. 8, and thus by means of connecting-rod $S^5$ have raised stop-member $S^7$ to intercept the following car, the impact of this car against such member being taken up by spring $s^7$. The center of gravity of the frame, with the car upon it, lying without its pivotal axis $d'$, such frame will tilt upward as soon as the operator actuates lever $S^8$ to relieve the brakes. The free end of the frame accordingly rises until engaged by catch $d^2$, the end of the car being at the same time opened, either manually or by mechanical means not shown, and its contents discharged. The tilting of the frame, it will be seen, relieves the pressure upon arm $S^6$ whereby the succeeding car would be allowed to move on were it not for latch $s^8$, which drops into catch $s^9$ just as arm $s^6$ is released.

When the dumping frame is locked in its upper position the car is engaged by the belt arrangement B and carried up on to upper tipple-track $T^3$, where gravity carries it toward the shaft. In passing up over the downwardly bent end $T^4$ of track $T^3$ such car trips lever $d^4$ and so releases the frame, which thereupon sinks to its normal position at a rate of speed controlled by the operator through lever $S^3$. As the frame drops into place it raises latch $s^8$ thus releasing stop $S^4$ so that the next car is then free to enter the dumping frame; whereupon the operation described repeats itself.

Having thus described the structure and operation of the several parts entering into our improved car-handling mechanism, it only remains to correlate such parts by indicating a complete cycle of operation. The loaded cars as they are collected are held on track T, from which position they are allowed to run, one at a time, upon lower deck $C^2$ of the cage as it rests at the bottom of the shaft. Thereupon the cage is raised to the top of the shaft and as it comes to rest upon keeps $F^2$ the car is automatically discharged upon lower tipple-track $T^2$ along which it proceeds to the dumping frame D. Here it is emptied of its contents in the manner just set forth in detail, and is then raised to the upper tipple-track $T^3$ which conducts it back to the mouth of the shaft. Here, as soon as the cage is in proper position to receive it, it is taken thereon and lowered again to the bottom where it is likewise automatically discharged onto track $T'$ and is ready to be hauled back into the mine and again loaded. The progress of a car, except for this last stage, is seen to be continuous through the system and for the greater part automatic, an attendant being required at three points only: at the bottom of the shaft to release the cars in order to allow them to enter the cage; at the top of the shaft to control the hoisting apparatus; and at the dumping frame to operate the brake.

Having thus described our invention in detail, that which we particularly point out and distinctly claim is:

1. In car-handling mechanism, the combination with a cage adapted to travel in a shaft, such cage being provided with a fixed inclined track; of a stop normally operative to retain a car on said track; and means adapted, in one position of said cage, to render said stop inoperative.

2. In car-handling mechanism, the combination with a cage adapted to travel in a shaft, such cage being provided with a fixed inclined track; of a movable stop adapted in one position to retain a car thereon, and in another position to permit the same to run off said track; and means adapted, in one position of said cage to render said stop inoperative.

3. In car-handling mechanism, the combination with a cage adapted to travel in a shaft, such cage being provided with a fixed inclined track; of a movable stop at the lower end of said track adapted in one position to retain a car thereon, and in another position to permit the same to run off said track; and means in the shaft fixed relatively to said cage, and adapted in one position of the latter to render said stop inoperative.

4. In car-handling mechanism the combination of a cage adapted to travel in a shaft, such cage bearing an inclined track; and a stop-device at the lower end of said track, said device comprising a rock-shaft bearing a stop-member and provided with a weighted arm whereby said stop-member is normally positioned to retain a car on said track; and means in the shaft fixed relatively to said cage and adapted upon downward movement of the latter thereby to engage said weighted arm and render said stop device inoperative.

5. In car-handling mechanism the combination of a cage adapted to travel in a shaft, such cage bearing an inclined track; a stop-device comprising a rock-shaft bearing a stop-member and provided with a weighted arm whereby said stop-member is normally positioned to retain a car on said track; and a latch in said shaft adapted to raise said weighted arm whereby said stop-member is actuated to release said car.

6. In car-handling mechanism, the combination with similarly inclined tracks abutting on opposite sides of a shaft and at different levels, of a cage adapted to travel in said shaft and bearing a track inclined in the same direction as aforesaid tracks and adapted to register therewith respectively.

7. In car-handling mechanism, the combination with two similarly inclined tracks abutting on opposite sides of a shaft and at different levels, of a cage adapted to travel in said shaft and bearing a track inclined in the same direction as aforesaid tracks and adapted to register therewith respectively.

8. In car-handling mechanism, the combination with a shaft, of an inclined mine-track abutting on one side of said shaft; a similarly inclined tipple-track abutting on the opposite side thereto; and a cage adapted to travel in said shaft and bearing a track adapted to register with said mine-track and said tipple-track respectively and being similarly inclined thereto.

9. In car-handling mechanism, the combination of a cage adapted to travel in a shaft and bearing an inclined track; a fixed track similarly inclined and adjacent to the path of travel of said cage; means adapted to retain a car on said cage-track; and means adapted to actuate such means to release said car when said cage-track registers with said fixed track.

10. In a car-handling mechanism the combination of a cage adapted to travel in a shaft and bearing an inclined track; a tipple-track similarly inclined; a stop-device on said cage comprising a rock-shaft bearing a stop-member and provided with a weighted arm whereby said stop-member is normally positioned to retain a car on said cage-track; and means adapted to raise said weighted arm, whereby said stop-member is actuated to release said car, when said cage-track registers with said tipple-track.

11. In car-handling mechanism for use in connection with a shaft, the combination of a track abutting on one side of said shaft and inclining downwardly thereto, a second track abutting on the opposite side of said shaft and inclining downwardly therefrom, a cage adapted to travel in said shaft and bearing a track inclined in the same direction as aforesaid tracks and adapted to register therewith respectively; and a movable stop on said cage adapted to retain a car on said cage-track.

12. In car-handling mechanism for use in connection with a shaft, the combination of a track abutting on one side of said shaft and inclining downwardly thereto, a second track abutting on the opposite side of said shaft and inclining downwardly therefrom, a cage adapted to travel in said shaft and bearing a track inclined in the same direction as aforesaid tracks and adapted to register therewith respectively; and a stop-device on said cage comprising a rock-shaft bearing a stop-member and provided with a weighted arm whereby said stop-member is normally positioned to retain a car on said cage-track.

13. In car-handling mechanism, for use in connection with a shaft, the combination of a track abutting on one side of said shaft and inclining downwardly thereto, a second track abutting on the opposite side of said shaft and inclining downwardly therefrom, a cage adapted to travel in said shaft and bearing a track inclined in the same direction as aforesaid tracks and adapted to register therewith respectively; a stop-device on said cage comprising a rock-shaft bearing a stop member and provided with a weighted arm whereby said stop-member is normally positioned to retain a car on said cage-track; and a latch in said shaft adapted to raise said weighted arm when said cage-track registers with said second track, whereby said stop-member is actuated to release such car.

14. In a car-handling mechanism the combination of a cage adapted to travel in a shaft and bearing a track pivotally mounted on a transverse axis, a mine-track adapted to register with said cage-track when the latter is inclined in one direction, and a tipple-track adapted to register with said cage-track when inclined in the opposite direction.

15. In car-handling mechanism, the combination with a shaft, of an inclined mine-track abutting on one side of said shaft; an oppositely inclined tipple-track abutting on the same side of said shaft; and a cage adapted to travel in said shaft; and bearing a track adapted to be inclined in one direction to correspond with said mine track and in the opposite direction to correspond with said tipple-track.

16. In car-handling mechanism, the combination with a shaft, of an inclined mine-track abutting on one side of said shaft; an oppositely inclined tipple-track abutting on the same side of said shaft; and a cage adapted to travel in said shaft and bearing a pivotally mounted track adapted to be inclined to correspond with said mine-track and said tipple-track respectively.

17. In a car-handling mechanism the combination of a cage adapted to travel in a shaft and bearing a track pivotally mounted on a transverse axis, a mine-track adapted to register with said cage-track when inclined in one direction, and a tipple-track adapted to register therewith when inclined in the opposite direction, and means for reversing the direction of inclination of said cage-track.

18. In car-handling mechanism a cage adapted to travel in a shaft, such cage being provided with a fixed inclined track and with a second track above such fixed track pivotally mounted upon a transverse axis.

19. In car-handling mechanism, a cage adapted to travel in a shaft, such cage being provided with a fixed inclined track and with a second track above such fixed track pivotally mounted upon a transverse axis and normally inclined in one direction; and optionally positioned means in said shaft adapted to reverse the direction of inclination of said pivoted track.

20. In car-handling mechanism, the combination with superposed tracks abutting on a shaft; of a cage traveling in such shaft and provided with superposed tracks adapted in one position of said cage to register with aforesaid tracks respectively.

21. In car-handling mechanism, the combination with a shaft, of inclined mine-tracks; inclined tipple-tracks; and a cage adapted to travel in said shaft and bearing tracks adapted to be alternately inclined to correspond with said mine-tracks and said tipple-tracks.

22. In car-handling mechanism the combination of similarly-inclined tracks at one end of a shaft, dissimilarly inclined tracks at the other end thereof, and a cage adapted to travel in said shaft and bearing tracks adapted to be alternately similarly and dissimilarly inclined.

23. In car-handling mechanism the combination with a shaft, of similarly-inclined mine-tracks; dissimilarly inclined tipple-tracks; and a cage adapted to travel in said shaft and bearing tracks adapted to be alternately inclined to correspond with said mine-tracks and said tipple-tracks.

24. In car-handling mechanism, the combination of a cage adapted to travel in a shaft and bearing a plurality of tracks; mine-tracks; and tipple-tracks; such mine and tipple-tracks being respectively adapted to register with said cage-tracks when said cage is positioned adjacent thereto.

25. In car-handling mechanism the combination of a cage adapted to travel in a shaft and bearing a plurality of superimposed tracks; mine-tracks; and tipple-tracks; such mine and tipple-tracks being respectively adapted to register with said cage-tracks when said cage is positioned adjacent thereto.

26. In a car-handling mechanism, the combination of a cage adapted to travel in a shaft and bearing a plurality of superimposed inclined tracks; a correspondingly-inclined set of mine-tracks and a similar set of tipple-tracks, respectively adapted to register with said cage-tracks when said cage is positioned adjacent thereto.

27. In a car-handling mechanism the combination of a cage adapted to travel in a shaft, such cage being provided with a fixed inclined track and with a second track above such fixed track pivotally mounted upon a transverse axis and normally inclined in one direction; means for tilting said pivoted track in the other direction; mine-tracks adapted to register with said cage-tracks when such pivoted track is inclined in one direction; and tipple-tracks, adapted to register therewith when said pivoted track is inclined in the other direction.

28. In car-handling mechanism, the combination of a tipple-track inclined downwardly toward a shaft; a cage adapted to travel in such shaft and bearing a track adapted to receive a car from said tipple-track; and automatic means for controlling the passage of cars from said tipple-track onto said cage-track, such means being actuated by said cage to admit a car onto said cage-track and by such car to retain the succeeding car.

29. In car-handling mechanism, the combination of a tipple-track inclined downwardly toward a shaft; a cage adapted to travel in such shaft and bearing a track adapted to receive a car from said tipple-track; a stop-device adapted to normally retain such car on said tipple-track; and means on said cage adapted to actuate said stop-device to release such car, such means being rendered inoperative by the reception of a car upon said cage-track.

30. In car-handling mechanism, the combination of a tipple-track inclined downwardly toward a shaft; a cage adapted to travel in such shaft and bearing a track adapted to receive a car from said tipple-track; a stop-device adapted to normally retain such car on said tipple-track; and means on said cage adapted to actuate said stop-device to release such car, such means being rendered inoperative by the reception of a car upon said cage-track; and independent means for rendering aforesaid means inoperative.

31. In car-handling mechanism the combination with two superposed tracks, of a track-section pivotally mounted on a transverse axis substantially on a line with the lower of said tracks, said track-section normally registering with said lower track and being adapted to register with the upper of said tracks.

32. In car-handling mechanism, the combination with two superposed tracks, of a track-section pivotally mounted on a transverse axis substantially on a line with the lower of said tracks, said track-section normally registering with said lower track and being movable by the weight of a car thereon to register with the upper of said tracks.

33. In car-handling mechanism, the combination with two superposed tracks, of a track-section pivotally mounted on a transverse axis lying below the level of the upper of said tracks, said track-section normally registering with the lower of said tracks and being movable by the weight of a car thereon to register with the upper of said tracks.

34. In car-handling mechanism, the combination with two aubtting track sections, one fixed and the other movable, of a stop-device on the first of said sections adapted to be rendered operative by the passage of a car onto the second of said sections.

35. In car-handling mechanism the combination with two abutting track-sections, one fixed and the other movable, of a stop-device on the first of said track-sections adapted to be rendered operative by the passage of a car onto the second thereof; and means for thus holding said stop-device, said means being controlled by the movement of said second track-section.

36. In car-handling mechanism, the combination with a downwardly inclined track, of an oscillatory track-bearing frame adapted to register therewith; and a stop-device on said inclined track adapted to be rendered operative by the passage of a car onto said frame.

37. In car-handling mechanism, the combination of an inclined track; an oscillatory track-section adapted to register therewith; a stop-device on said inclined track adapted to be rendered operative by the passage of a car onto said track-section; and means for thus holding said stop-device, said means being controlled by the oscillation of said track-section.

38. In car-handling mechanism the combination with a downwardly inclined track, of an oscillatory track-bearing frame normally registering therewith and adapted to be tilted upwardly by the weight of a car resting thereon; a stop-device on said inclined track adapted to be rendered operative by the passage of a car onto said frame; and means adapted to hold said stop-device in its operative position pending the movement of said frame and to release the same upon the return of said frame to its normal position.

39. In car-handling mechanism, the combination of two superposed tracks; a track-section pivotally mounted on a transverse axis lying at substantially the same level as the lower of said tracks, said track-section normally registering with such lower track and being adapted to register with the upper of said tracks; and a stop-device on said lower track adapted to be rendered operative by the passage of a car onto said track-section.

40. In car-handling mechanism, the combination of two superposed tracks; a track-section pivotally mounted on a transverse axis lying at substantially the same level as the lower of said tracks, said track-section normally registering with such lower track and being adapted to register with the upper of said tracks; a stop-device on said lower track adapted to be rendered operative by the passage of a car onto said track-section; and means adapted to hold said stop-device in its operative position pending the movement of said track-section and to release the same upon the return of said frame to its normal position.

41. In car-handling mechanism the combination with a downwardly inclined track and an oppositely inclined track thereabove, of an oscillatory track-bearing frame adapted normally to receive a car from the lower of said tracks and movable into position to discharge the same onto the upper of said tracks; and a stop-device on said lower track adapted to be rendered operative by the passage of a car onto said frame.

42. In a car-handling mechanism, the combination with a downwardly inclined track and an oppositely inclined track thereabove, of track bearing frame adapted to receive a car from the lower of said tracks and to be tilted by the weight of such car into position to discharge the same onto the upper of said tracks; a stop-device on said lower track adapted to be rendered operative by the passage of a car onto said frame; and means adapted to hold said stop device in its operative position pending the movement of said frame and to release the same upon the return of said frame to its normal position.

43. In car-handling mechanism, the combination with two track-sections, one fixed and the other movable, of a stop-device on the first of said sections adapted to be rendered operative by the passage of a car onto the second of said sections, such device comprising a pivoted arm projecting above such first section, another pivoted arm projecting above such second section, and a connecting rod joining said two arms.

44. In car-handling mechanism, the combination of a fixed track-section; an oscillatory track-section normally registering therewith and adapted to be oscillated by the weight of a car thereon; and a stop-device on said fixed section adapted to be rendered operative by the passage of a car on said oscillatory section.

45. In car-handling mechanism, the combination of a fixed track-section; an oscillatory track-section normally registering therewith and adapted to be oscillated by the weight of a car thereon; and a stop-device on said fixed section adapted to be rendered operative by the passage of a car on said oscillatory section, such device comprising a pivoted arm projecting above such first section, another pivoted arm projecting above such second section, and a connecting rod joining said two arms.

46. In car-handling mechanism, the combination of a fixed track-section; an oscillatory track-section normally registering therewith and adapted to be oscillated by the weight of a car thereon; a stop-device on said fixed section adapted to be rendered operative by the passage of a car on said oscillatory section, such device comprising a pivoted arm projecting above such first section, another pivoted arm projecting above such second section, and a connecting rod joining said two arms; and a latch adapted to secure said connecting rod, said latch being operable by said oscillatory section.

47. In car-handling mechanism, the combination with two tracks, one above the other, of an oscillatory, track-bearing, frame adapted normally to register with one of said tracks and to be actuated by the weight of the car to register with the other of said tracks; and independently controlled means for regulating the movement of said frame.

48. In car-handling mechanism the combination with two tracks, one above the other, of an oscillatory track-bearing frame adapted normally to register with the lower of said tracks and to be actuated by the weight of a car to register with the upper of said tracks; and an independently controlled brake for regulating the movement of said frame.

49. In car-handling mechanism, the combination of two superposed tracks, an oscillatory track-section adapted to register with said tracks, respectively, and an endless cable disposed to move along one of said tracks and said track-section, when the latter is in register with said track, whereby a car may be moved off the one onto the other.

50. In car-handling mechanism, the combination of two superposed tracks, an oscillatory track-section adapted to register with said tracks, respectively, the axis of oscillation of said track-section being substantially on a line with the lower of said tracks, whereby a car may run off said track onto said track-section, and means adapted to move a car off said track-section onto the other of said tracks when the former is in register with the latter.

51. In car-handling mechanism, the combination of two superposed tracks, an oscillatory track-section adapted to register with said tracks, respectively, the axis of oscillation of said track-section being substantially on a line with the lower of said tracks, whereby a car may run off said track onto said track-section, and an endless cable adapted to move a car off said track-section onto the other of said tracks when the former is in register with the latter.

52. In car-handling mechanism, the combination of two superposed tracks, a track-section pivotally mounted on a transverse axis substantially on a line with the lower of said tracks, said track-section normally registering with said lower track and being movable into register with the upper of said tracks, and means adapted to move a car off said track-section when in such second position.

53. In car-handling mechanism, the combination with two tracks, one above the other, of an oscillatory track-section adapted normally to register with the lower of said tracks and to be tilted by the weight of a car to register with the upper of said tracks; and means adapted to move a car off such oscillatory frame onto said upper track.

54. In car-handling mechanism, the combination of a downwardly inclined track, an oppositely inclined track thereabove, an oscillatory track-section normally registering with said first track and movable into register with said second track, and an endless cable adapted to move a car off said track-section when in such second position.

55. In car-handling mechanism, the combination of a downwardly inclined track, an oppositely inclined track thereabove, an oscillatory track-section normally registering with said first track and movable into register with said second track, and means adapted to move a car off said track-section when in such second position.

56. In car-handling mechanism, the combination of a downwardly inclined track, an oppositely inclined track thereabove, a track-section pivotally mounted on a transverse axis lying at substantially the same level as said first track, said track-section normally registering with said first track and being movable by the weight of a car thereon into register with said second track, and means adapted to move a car off said track-section when in such second position.

57. In car-handling mechanism, the combination of a downwardly inclined track, an oppositely inclined track thereabove, a track-section pivotally mounted on a transverse axis lying at substantially the same level as said first track, said track-section normally registering with said first track and being movable by the weight of a car thereon into register with said second track, and means adapted to move a car off said track section when in such second position, such means including an endless cable disposed parallel with said track-section when so positioned, and adapted to engage such car.

58. In car-handling mechanism, the combination of a downwardly inclined track, an oppositely inclined track thereabove, a track-section pivotally mounted on a transverse axis lying at substantially the same level as said first track, said track-section normally registering with said first track and being movable by the weight of a car thereon into register with said second track, and means adapted to move a car off said track-section when in such second position, such means including an endless cable disposed parallel with said track-section when so positioned, and adapted to periodically engage such car.

59. In car-handling mechanism, the combination of a track; a movable track-section adapted to register therewith to discharge a car thereon; and means adapted to secure said track-section in such registering position, said means being operable to release said track-section by the passage of a car therefrom onto said track.

60. In car-handling mechanism, the combination with two tracks, one above the other; of an oscillatory track-section normally registering with the lower of said tracks and adapted to register with the upper thereof; and means adapted to retain such track-section in register with said upper track and to be actuated to release the same upon the passage of a car along said upper track.

61. In car-handling mechanism, the combination with two tracks, one above the other, of an oscillatory track-bearing frame adapted normally to register with the lower of said tracks and to be tilted by the weight of a car to register with the upper of said tracks; and means adapted to retain said frame in such tilted position and to be actuated to release said frame upon the passage of a car along said upper track.

62. In car-handling mechanism, the combination with two tracks, one above the other; of an oscillatory track-section normally registering with the lower of said tracks, and adapted to be moved by the weight of a car to register with the upper of said tracks; a catch normally positioned to engage said track-section when in such second position; and a lever-arm projecting above said upper track and connected with such catch, said arm being disposed so as to be actuated by a car passing along said track to withdraw said catch.

63. In car-handling mechanism, the combination with two tracks, one above the other; of an oscillatory track-section adapted normally to register with the lower of said tracks and to be moved by the weight of a car into register with the upper thereof; means adapted to move a car off said track-section onto the upper of said tracks; and means adapted to retain said track-section in register with said upper track and to be actuated to release the same upon the passage of a car along said upper track.

64. In car-handling mechanism, the combination with two tracks, one above the other; of an oscillatory track-section adapted to register with the lower of said tracks and to be moved by the weight of a car into register with the upper thereof; a stop on said lower track adapted to be rendered operative by the passage of a car onto said track-section; means adapted to move such car off said track-section onto said upper track when said track-section is in register therewith; and means adapted to retain said track-section in register with said upper track and to be actuated to release the same upon the passage of a car along said upper track.

65. In car-handling mechanism, the combination with two tracks leading respectively from and to a shaft, of a cage traveling in such shaft, said cage being provided with track-sections arranged and constructed simultaneously to discharge a car onto the first of said tracks and to receive a car from the second of said tracks.

66. In car-handling mechanism, the combination with two tracks abutting on a shaft at different levels, of a cage traveling in such shaft, said cage being provided with track-sections arranged and constructed simultaneously to discharge a car onto one of said tracks and to receive a car from the other of said tracks.

67. In car-handling mechanism, the combination with two superposed tracks abutting on a shaft, of a cage traveling in such shaft, said cage being provided with two track-sections also superposed, and arranged and constructed simultaneously to discharge a car from the lower of said track-sections onto the lower of said tracks and to receive a car upon the upper of said track-sections, from the upper of said tracks.

68. In car-handling mechanism, the combination of a vertically movable cage adapted to carry a car, means for automatically discharging such car from said cage, and means for automatically dumping the same and returning it to said cage.

69. In car-handling mechanism, the combination of two superposed tracks abutting on a shaft; a cage traveling in such shaft, adapted to discharge a car onto one of said tracks and to simultaneously receive a car from the other of said tracks; and means connected with said first track adapted to dump a car and transfer it to the latter.

70. In car-handling mechanism the combination of two similarly-inclined mine-tracks; two dissimilarly inclined tipple-tracks; a cage adapted to travel in a shaft and bearing tracks adapted alternately to register with said mine-tracks and with said tipple-tracks; and an oscillatory frame adapted to receive a car from one of said tipple-tracks and to return it to the other thereof.

71. In car-handling mechanism, the combination of two tracks leading respectively from and to a shaft; a cage traveling in such shaft adapted automatically to discharge a car onto the first of said tracks and to simultaneously receive a car from the second of said tracks.

72. In a car-handling mechanism, the combination of two tracks leading respectively from and to a shaft; a cage traveling in such shaft, adapted to discharge a car onto the first of said tracks and to receive a car from the second of said tracks; and means connected with said first track adapted to dump a car and transfer the same to said second track.

73. In car-handling mechanism, the combination of two tracks leading respectively from and to a shaft; a cage traveling in such shaft and adapted to automatically discharge a car onto the first of said tracks and to receive a car from the second of said tracks; and means connected with said first track adapted to automatically dump a car and transfer the same to said second track.

74. In car-handling mechanism, the combination of two tracks leading respectively from and to a shaft; a cage traveling in such shaft adapted automatically to discharge a car onto the first of said tracks and to simultaneously receive a car from the second of said tracks; and means connected with said first track adapted to automatically dump a car and transfer the same to said second track.

75. In car-handling mechanism, the combination of two mine-tracks leading respectively to and from a shaft; two tipple-tracks leading respectively to and from such shaft; and a cage traveling in such shaft, adapted in one position to automatically receive a car from said first mine-track and discharge a car onto said second mine-track, and in another position to automatically receive a car from said first tipple-track and to discharge a car onto said second tipple-track.

76. In car-handling mechanism, the combination of two mine-tracks leading respectively to and from a shaft; two tipple-tracks leading respectively to and from such shaft; a cage traveling in such shaft, adapted in one position to automatically receive a car from said first mine-track and discharge a car onto said second mine-track, and in another position to automatically receive a car from said first tipple-track and to discharge a car onto said second tipple-track and means connected with said second tipple-track adapted to dump a car and transfer the same onto said first tipple-track.

77. In car-handling mechanism, the combination of two mine-tracks leading respectively to and from a shaft, two tipple-tracks leading respectively to and from such shaft; a cage traveling in such shaft, adapted in one position to automatically receive a car from said first mine-track, and discharge a car onto said second mine-track, and in another position to automatically receive a car from said first tipple-track and to discharge a car onto said second tipple-track and means connected with said second tipple-track adapted to automatically dump a car and transfer the same onto said first tipple-track.

Signed by us, this 2nd day of November 1905.

FRANK C. GREENE.
CHARLES G. PALMER.

Attested by—
O. V. GREENE,
E. F. THROWER.